United States Patent [19]

Corrado et al.

[11] 4,292,218

[45] Sep. 29, 1981

[54] LOW VISCOSITY UNSATURATED POLYESTER RESINS

[76] Inventors: Giovanni Corrado, 190, Via Gentile da Mogliano, Roma; Elvio Bertotti, 45, Corso Garibaldi, Colleferro, Roma; Bruno Sopino, 21, Via Belvedere, Colleferro, all of Italy

[21] Appl. No.: 107,710

[22] Filed: Dec. 27, 1979

[30] Foreign Application Priority Data

Dec. 29, 1978 [IT] Italy ................................ 31406 A/78

[51] Int. Cl.$^3$ ........................ C08L 91/00; C08G 63/52
[52] U.S. Cl. ................................ 260/22 CB; 525/445; 528/303
[58] Field of Search .................... 525/445; 528/303; 260/22 R, 22 RB

[56] References Cited

U.S. PATENT DOCUMENTS

| | | | |
|---|---|---|---|
| 2,944,994 | 7/1960 | Singleton et al. | 528/303 X |
| 2,951,823 | 9/1960 | Sauer | 528/303 X |
| 3,511,792 | 5/1970 | Helm et al. | 260/22 R |
| 3,715,233 | 2/1973 | Harrier | 528/303 X |
| 3,721,642 | 3/1973 | Schalin et al. | 525/445 X |
| 3,736,278 | 5/1973 | Wada et al. | 528/303 X |
| 3,830,772 | 8/1974 | Busch et al. | 525/445 X |

*Primary Examiner*—Lucille M. Phynes
*Attorney, Agent, or Firm*—Hubbell, Cohen, Stiefel & Gross

[57] ABSTRACT

A low viscosity unsaturated polyester resin for making buttons is described, which comprises an alkyd prepared by esterification of maleic anhydride and/or acid and/or fumaric acid, optionally together with phthalic anhydride and/or acid and/or adipic, sebacic, azelaic or dodecanedioic acid, with one or more glycols, essentially comprising dipropylene glycol, and further comprises 20–30% by weight of the total resins of an ethylenically unsaturated monomer copolymerizable with the alkyd, essentially chosen among styrene and vinyl toluene, the alkyd having a molecular weight/double bond factor between 300 and 390 and an amount of free functional groups between 80 and 100 mg of KOH per g of alkyd inclusive. The buttons obtainable from said resin are also described. The disc blanks made from said resin have better workability and cause less wear of the tools than those of the prior art and the finished buttons have greater impact strength, and better lustre, greater color stability when exposed to sun light.

6 Claims, No Drawings

LOW VISCOSITY UNSATURATED POLYESTER RESINS

BACKGROUND OF THE INVENTION (a) The Field of the Invention

The present invention relates to low viscosity unsaturated polyester resins, essentially comprising an unsaturated polyester alkyd and an ethylenically unsaturated monomer copolymerizable with the alkyd. The present invention relates also to the products, particularly buttons in all their marketable forms, obtained from said polyester resins by any processing technique suitable for such a purpose.

(b) The Prior Art

Commercial products called "unsaturated polyester resins", obtained by mixing an unsaturated polyester alkyd with a copolymerizable monomer, are known; the known resins however have a higher viscosity, an inferior workability, a lower luster and an inferior resistance to repeated washings, than the resins of the present invention, the amount of monomer and the elastic modulus and heat distortion temperatures (HDT) of the hardened pure resin being equal. In other words, the applicant has surprisingly found, and this forms an object of the present invention, that it is possible to obtain low viscosity unsaturated polyester resins having a low styrene content, adapted to the production of buttons by the conventional processing techniques. In a non limitative manner, centifugation and casting in bars or flat sheets are indicated as suitable processes.

SUMMARY OF THE INVENTION

An object of the present invention is low viscosity unsaturated polyester resins for making buttons, in all the marketable forms which can be made from polyester resins, by conventional processing techniques such as centrifugation and casting, essentially comprising (A) an alkyd prepared by esterification of (a) maleic anhydride and/or acid and/or fumaric acid alone or in association with phthalic anhydride and/or acid and/or adipic, sebacic, azelaic or dodecanedioic acid, with (b) one or more glycols, essentially comprising dipropyleneglycol, and at least (B) one ethylenically unsaturated monomer copolymerizable with (A), essentially chosen among styrene and/or vinyl toluene, in an amount of 20-30% by weight of the total (A)+(B), said unsaturated polyester resins being characterized by the fact that an alkyd having a molecular weight/double bond factor comprised between 300 and 390 and having an amount of free functional groups (constituted by hydroxyl groups+carboxyl groups) expressed as mg of KOH per g of alkyd, between 80 and 100 inclusive is employed as alkyd (A). The word "essentially" is to be construed, in the present specification, as meaning a content higher than 90% by weight. Preferably fumaric acid mixed with adipic acid (preferably in molar amounts of 95% and 5% respectively) is employed as component (a), 1,2-dipropyleneglycol is employed as component (b), and styrene is employed as component (B).

The calculation of the molecular weight per double bond factor (P.M./C=C—), referred to in the description and in the claims, is illustrated hereinafter for the unsaturated polyester of Example 1, viz. a polyester based on fumaric acid, phthalic anhydride, adipic acid and dipropylene glycol. The molecular weight of fumaric acid is $116 \times 0.65$ mols = 75; the molecular weight of phthalic anhydride is $148 \times 0.32$ mols = 47; the molecular weight of adipic acid is $146 \times 0.03$ mols = 4; the molecular weight of dipropylene glycol is $134 \times 1.0$ mols = 134; the sum of said four members is equal to 260 (75+47+4++134); by subtracting the weight of 1.68 mols of water ($1.68 \times 18 = 30$) 230 is obtained; the ratio of 230 to 0.65 (which represents the number of mols of double bonds), is 354 which is the value sought (P.M./C=C— factor).

The lower content of styrene, of the resins according to the invention, with respect to the conventional resins the elastic modulus and heat distortion temperature (HDT) of the hardened pure resin being equal, produces not only ecological advantages, but, in association with the particular structure of the resins which are an object of the present invention, also and particularly produces the following advantages:

better mechanical working during turning and boring of the disc-like blank, consisting in a longer life of the tool;

greater luster of the finished button due to a lower refraction index of the resin and to a better orientation of the pearl essence (mother of pearl pigment);

better impact resistance of the button;

better resistance to the washing in water;

better resistance to yellowing due to sunlight;

the turned buttons are easier to polish as a consequence of the milder action of the tools used for turning.

The process for the preparation of the unsaturated polyester resins which are an object of the present invention, does not differ from those generally known in the art, although attention must be paid to the fact that the amounts of reagents for producing the alkyd must be chosen in such a way as to obtain an alkyd which has a molecular weight/double bond factor comprised between 300 and 390 and an amount of free functional groups (constituted by hydroxyl groups+carboxyl groups) expressed as mg of KOH per g of alkyd, between 80 and 100 inclusive. The polyesterification reaction is carried out as usual at temperatures comprised between 150° and 250° C. in the absence or in the presence of aromatic solvents, such as xylene, toluene, etc., having the function of azeotropic agents, and in an atmosphere of an inert gas such as nitrogen, carbon dioxide etc. At temperatures comprised between 30° and 190° C., viz. after cooling the reaction mixture once the predetermined acid number has been obtained, the usual amounts of conventional cross-linking inhibitors, such as quinones, hydroquinones, quaternary ammonium salt, nitrophenoles, sulfonic acid, etc., alone or mixed with one another, may be added.

In particular, in the non limitative case that styrene is used as copolymerizable monomer, the following viscosity values expressed as cps at 25° C., as a function of the styrene content in the total alkyd+styrene, are obtained:

| % by weight of styrene on the total | Viscosity ± 10% at 25° C. |
|---|---|
| 20 | 1800 cps |
| 25 | 1000 cps |
| 30 | 400 cps |

A further object of the present invention is the buttons, in all their marketable forms, obtained from the unsaturated polyester resins hereinbefore described, by the conventional unsaturated polyester resin processing techniques. Such techniques include, in particular, centrifugation and casting in bars or flat sheets, but others may be used.

The peculiarity of the present invention consists in an improvement of the workability of the disc blanks and in the better physical and mechanical characteristics of the finished buttons as well as in the better ecological conditions which may be maintained in the workroom.

DETAILED DESCRIPTION OF PREFERRED EMBODIEMENTS

The following examples are illustrative and are not intended to limit the present invention in any way. The parts and percentages are by weight.

EXAMPLE 1

75 parts of fumaric acid, 45 parts of phthalic anhydride and 4 parts of adipic acid are reacted with 134 parts of 1,2-dipropylene glycol in the usual manner at 190° C. in inert gas atmosphere. The reaction is stopped at an acid number of 40 mg KOH/g of alkyd. Said alkyd has a PM/—C═C— factor of 354, and an amount of free functional groups, as hereinbefore defined, equal to 80 mg KOH/g of alkyd.

200 parts of said alkyd are mixed with 56 parts of styrene containing 0.06 parts of hydroquinone.

The viscosity at 25° C. of the resin obtained is 1500 cps. The heat distortion temperature (HDT according to ASTM D648) of the hardened pure resin is 72° C.

EXAMPLE 1a 5.58 Kg of the resin obtained according to Example 1, with the addition of 1% of yellow pigment, 0.5% of synthetic pearl essence, 0.1% of paraffin, 0.3% of cobalt octoate containing 1% of metal, 1% of methylethylketone peroxide (50% solution) is cast in a centrifuge such as commonly used for buttons, having a diameter of 880 mm and a width of 570 mm, which rotates at a speed of about 100 revolutions per minute so as to create a layer of 3 mm.

The gelling of the resin in the centrifuge occurs after 5 minutes. After 30 minutes the centrifuge is stopped and the soft sheet thus obtained is extracted.

The sheet is laid on a plane.

After 20 more minutes the sheet is punched with a conventional machine, whereby to obtain disc blanks which are further polymerized until a degree of hardness suitable for the following processing stages is obtained.

The buttons, made from the aforesaid blanks by conventional processes, have the following improved characteristics, as compared to analogous buttons made from orthophthalic unsaturated polyester resins, usually employed for this purpose, prepared from propylene and/or diethylene glycols, maleic anhydride, phthalic anhydride and adipic acid:

a. 30% greater impact resistance. If 100 buttons are allowed to fall on a marble surface from a height of 10 m, the number of buttons which are chipped decreases by 30%;

b. higher luster;

c. the stoppages during working due to the change of tools decrease by 50%;

d. after 3 months of exposure to sunlight no yellowing is observed, contrary to what occurs in the case of conventional buttons.

We claim:

1. Low viscosity unsaturated polyester resins for making buttons, in all their marketable forms which can be made from polyester resins, by conventional processing techniques such as centrifugation and casting, essentially comprising:

(A) an alkyd prepared by esterification of
  (a) a compound selected from the group consisting of maleic anhydride, maleic acid, fumaric acid and mixtures thereof alone or in association with a compound selected from the group consisting of phthalic anhydride phthalic acid adipic acid, sebacic acid, dodecanediois acid, and mixture thereof with
  (b) one or more glycols, essentially comprising dipropylene glycol, and at least
(B) one ethylenically unsaturated monomer copolymerizable with (A), selected from the group consisting of styrene, vinyl toluene and a mixture thereof, in an amount of 20–30% by weight of the total (A)+(B), said unsaturated polyester resins being characterized in that said alkyd (A) has a molecular weight/double bond factor between 300 and 390 and an amount of free functional groups constituted by hydroxyl groups+carboxyl groups, from 80 to 100, inclusive expressed as mg of KOH per g of alkyd.

2. Unsaturated polyester resins according to claim 1, wherein styrene is employed as said copolymerizable monomer, characterized by the fact that said resins have the following viscosity values expressed as cps at 25° C. as a function of the styrene content in the total alkyd+styrene

| % by weight of styrene on the total | Viscosity ± 10% at 25° C. |
|---|---|
| 20 | 1800 cps |
| 25 | 1000 cps |
| 30 | 400 cps. |

3. Unsaturated polyester resins according to either of claims 1 or 2, characterized in that fumaric acid mixed with adipic acid is employed as component (a), 1,2-dipropylene glycol is employed as component (b), and styrene is employed as component (b).

4. Polyester resins according to either of claims 1 or 2, wherein said resins are processed into final products by certrifugation or casting into bars or plane sheets.

5. The polyester resins of claim 4, wherein said products are buttons.

6. The polyester resins according to claim 3, wherein said fumaric acid adipic acid mixture has a molar amount of 95% fumaric acid and 5% adipic acid.

* * * * *